United States Patent
Winstead et al.

(10) Patent No.: US 10,006,991 B2
(45) Date of Patent: Jun. 26, 2018

(54) VELOCITY AND ATTITUDE ESTIMATION USING AN INTERFEROMETRIC RADAR ALTIMETER

(71) Applicant: Honeywell International Inc., Morristown, NJ (US)

(72) Inventors: Benjamin J. Winstead, Minneapolis, MN (US); Adam Moya, Chandler, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 520 days.

(21) Appl. No.: 14/811,059

(22) Filed: Jul. 28, 2015

(65) Prior Publication Data

US 2018/0074187 A1    Mar. 15, 2018

Related U.S. Application Data

(60) Provisional application No. 62/114,694, filed on Feb. 11, 2015.

(51) Int. Cl.
*G01S 13/60* (2006.01)
*G01S 13/44* (2006.01)
*G01S 13/58* (2006.01)

(52) U.S. Cl.
CPC .......... *G01S 13/60* (2013.01); *G01S 13/4454* (2013.01); *G01S 13/588* (2013.01)

(58) Field of Classification Search
CPC .... G01S 13/4454; G01S 13/588; G01S 13/60; G01S 13/605; G01S 13/64; G01S 13/882
See application file for complete search history.

(56) References Cited

U.S. PATENT DOCUMENTS

| | | | |
|---|---|---|---|
| 3,177,348 A | 4/1965 | Daniloff et al. | |
| 3,739,379 A | 6/1973 | Davis | |
| 3,996,589 A | 12/1976 | Breese | |
| 4,069,468 A | 1/1978 | Bartram | |
| 4,170,006 A * | 10/1979 | Falk | G01S 13/9011 342/109 |

(Continued)

OTHER PUBLICATIONS

European Patent Office, "Extended European Search Report from EP Application No. 16153713.9 dated Jun. 14, 2016", from Foreign Counterpart of U.S. Appl. No. 14/613,879, filed Jun. 14, 2016, pp. 1-8, Published in: EP.

(Continued)

*Primary Examiner* — Peter M Bythrow
(74) *Attorney, Agent, or Firm* — Fogg & Powers LLC

(57) ABSTRACT

A method and system for estimating velocity of an aircraft is provided. The method comprises transmitting a beam toward a surface from the aircraft using a Doppler beam sharpened radar altimeter, receiving a plurality of reflected signals that correspond to portions of the transmitted beam that are reflected by the surface, and forming a plurality of Doppler beams by filtering the received signals. A complex-valued array of range bin is computed with respect to frequency of the Doppler beams from at least one antenna aperture of the radar altimeter, and a range for each of the Doppler beams is estimated. A velocity vector magnitude for the aircraft is estimated by a curve fit of the range with respect to the frequency of the Doppler beams.

19 Claims, 9 Drawing Sheets

(56) References Cited

U.S. PATENT DOCUMENTS

| | | | |
|---|---|---|---|
| 4,594,676 A | | 6/1986 | Breiholz et al. |
| 4,698,636 A | * | 10/1987 | Marlow .................. G01S 13/60 |
| | | | 342/104 |
| 4,706,092 A | * | 11/1987 | Magne ..................... G01S 13/60 |
| | | | 342/109 |
| 4,806,935 A | * | 2/1989 | Fosket ................... G01S 7/4056 |
| | | | 342/120 |
| 5,014,063 A | * | 5/1991 | Studenny ............... G01S 13/342 |
| | | | 342/109 |
| 5,736,957 A | | 4/1998 | Raney |
| 5,867,119 A | | 2/1999 | Corrubia et al. |
| 6,018,698 A | | 1/2000 | Nicosia et al. |
| 6,255,982 B1 | | 7/2001 | Hethuin |
| 6,362,776 B1 | | 3/2002 | Hager et al. |
| 6,738,563 B1 | | 5/2004 | Hager et al. |
| 7,218,268 B2 | | 5/2007 | VandenBerg |
| 7,248,208 B2 | | 7/2007 | Hager et al. |
| 7,911,375 B2 | | 3/2011 | Winstead et al. |
| 9,110,170 B1 | | 8/2015 | Woollard et al. |
| 9,304,198 B1 | * | 4/2016 | Doerry ..................... G01S 13/88 |
| 9,846,229 B1 | * | 12/2017 | Doerry ................ G01S 13/9035 |
| 9,864,053 B2 | * | 1/2018 | Winstead ............... G01S 13/582 |
| 2003/0102999 A1 | | 6/2003 | Bergin et al. |
| 2003/0210180 A1 | | 11/2003 | Hager et al. |
| 2003/0214431 A1 | | 11/2003 | Hager et al. |
| 2004/0145514 A1 | | 7/2004 | Raney |
| 2004/0227658 A1 | | 11/2004 | VandenBerg |
| 2004/0252048 A1 | | 12/2004 | Hager et al. |
| 2005/0253750 A1 | | 11/2005 | Hager et al. |
| 2005/0273257 A1 | | 12/2005 | Hager et al. |
| 2005/0275584 A1 | | 12/2005 | Hager et al. |
| 2006/0044182 A1 | | 3/2006 | Vacanti |
| 2006/0049977 A1 | | 3/2006 | Vacanti |
| 2007/0075893 A1 | * | 4/2007 | Filias ..................... G01C 21/16 |
| | | | 342/104 |
| 2007/0273572 A1 | | 11/2007 | Thomas et al. |
| 2008/0246648 A1 | | 10/2008 | Winstead et al. |
| 2010/0302088 A1 | | 12/2010 | Winstead et al. |
| 2016/0139257 A1 | * | 5/2016 | Yamashina ........... G01S 13/584 |
| | | | 342/109 |
| 2016/0223665 A1 | | 8/2016 | Winstead |
| 2017/0350971 A1 | | 12/2017 | Winstead et al. |

OTHER PUBLICATIONS

European Patent Office, "Extended European Search Report from EP Application No. 16153545.5 dated Jun. 14, 2016", from Foreign Counterpart of U.S. Appl. No. 14/613,888, filed Jun. 14, 2016, pp. 1-8, Published in: EP.

European Patent Office, "Partial European Search Report from EP Application No. 16154354.1 dated Jun. 14, 2016", from Foreign Counterpart of U.S. Appl. No. 14/811,059, filed Jun. 14, 2016, Published in: EP.

Choi et al., "A new Approach of FMCW-DBS Altimeters for Terrain-aided Navigation", IEICE, Sep. 23, 2013, pp. 214-217, Publisher: 2013 Asia- Pacific Conference on Synthetic Aperture Radar (APSAR).

Halimi et al., "A Semi-Analytical Model for Delay/Doppler Altimetry and Its Estimation Algorithm", IEEE Transactions on Geoscience and Remote Sensing, Jul. 1, 2014, pp. 4248-4258, vol. 52, No. 7, Publisher: IEEE.

Raney, "The Delay/Doppler Radar Altimeter", IEEE Transcations on Geoscience and Remote Sensing, Apr. 1, 1997, pp. 1578-1588, vol. 36, No. 5, Publisher: IEEE.

United States Patent and Trademark Office, "Office Action", From U.S. Appl. No. 14/613,879, filed Jul. 6, 2017, pp. 1-25, Published in: US.

Winstead, "Systems and Methods for Measuring Velocity With a Radar Altimeter", U.S. Appl. No. 14/613,879, filed Feb. 4, 2015, pp. 1-38, Published in: US.

Winstead et al., "Systems and Methods for Using Velocity Measurements to Adjust Doppler Filter Bandwidth", U.S. Appl. No. 14/613,888, filed Feb. 4, 2015, pp. 1-38, Published in: US.

European Patent Office, "Communication Pursuant to Article 94(3) for EP Application No. 16153713.9", Foreign Counterpart to U.S. Appl. No. 14/613,879, filed Aug. 22, 2017, pp. 1-7, Published in: EP.

European Patent Office, "Communication Pursuant to Article 94(3) for EP Application No. 16153545.5", Foreign Counterpart to U.S. Appl. No. 14/613,888, filed Aug. 22, 2017, pp. 1-4, Published in: EP.

United States Patent and Trademark Office, "Notice of Allowance", From U.S. Appl. No. 14/613,888, filed Sep. 12, 2017, pp. 1-17, Published in: US.

United States Patent and Trademark Office, "Notice of Allowability", From U.S. Appl. No. 14/613,888, filed Oct. 30, 2017, pp. 1-6, Published in: US.

United States Patent and Trademark Office, "Notice of Allowance and Fee(s) Due", "from U.S. Appl. No. 14/613,879", filed Dec. 7, 2017, pp. 1-16, Published in: U.S.

European Patent Office, "Communication under Rule 71(3) from EP Application No. 16154354.1", "from Foreign Counterpart to U.S. Appl. No. 14/811,059", filed Nov. 14, 2017, pp. 1-32, Published in: EP.

European Patent Office, "Extended European Search Report from EP Application No. 16154354.1 dated Aug. 22, 2016", from Foreign Counterpart of U.S. Appl. No. 14/811,059, filed Aug. 22, 2016, pp. 1-10, Published in: EP.

* cited by examiner

VELOCITY AND ATTITUDE ESTIMATION USING AN INTERFEROMETRIC RADAR ALTIMETER

This application claims the benefit of priority to U.S. Provisional Application No. 62/114,694, filed on Feb. 11, 2015, the disclosure of which is incorporated by reference.

BACKGROUND

Many aircraft today rely on the Global Positioning System (GPS) to provide accurate position data for navigation. This is particularly helpful over large distances, such as ocean crossings, where there are no ground-based radio navigation sources. If GPS is not available, aircraft also use inertial navigation systems to estimate their position over time. However, the position error of an inertial navigation system alone will drift over time, and its drift rate will increase over some period of time due to inaccurate estimation of platform velocity. The position error can increase by many kilometers over the time of flight across an ocean. The drift can be reduced by using a Doppler navigation system, which provides an independent source of velocity information.

Conventional Doppler navigation systems require narrow radar beams aimed in multiple directions to achieve accurate measurement of Doppler frequency shift in each direction. The Doppler frequency shift is proportional to the velocity in a particular direction. Measuring velocity in three or more directions allows a Doppler navigation system to create a velocity vector, which can be integrated over time to compute the change in position of an aircraft. This velocity vector can also be used as an additional velocity estimate input to an inertial navigator.

Narrow radar beams used in Doppler navigation systems require large antenna surfaces and/or higher transmit frequencies. The larger antenna surfaces are especially undesirable for small aircraft. Higher transmit frequencies make Doppler navigation systems more susceptible to signal loss through air or clouds.

SUMMARY

A method and system for estimating velocity of an aircraft is provided. The method comprises transmitting a beam toward a surface from the aircraft using a Doppler beam sharpened radar altimeter, receiving a plurality of reflected signals that correspond to portions of the transmitted beam that are reflected by the surface, and forming a plurality of Doppler beams by filtering the received signals. A complex-valued array of range bin is computed with respect to frequency of the Doppler beams from at least one antenna aperture of the radar altimeter, and a range for each of the Doppler beams is estimated. A velocity vector magnitude for the aircraft is estimated by a curve fit of the range with respect to the frequency of the Doppler beams.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
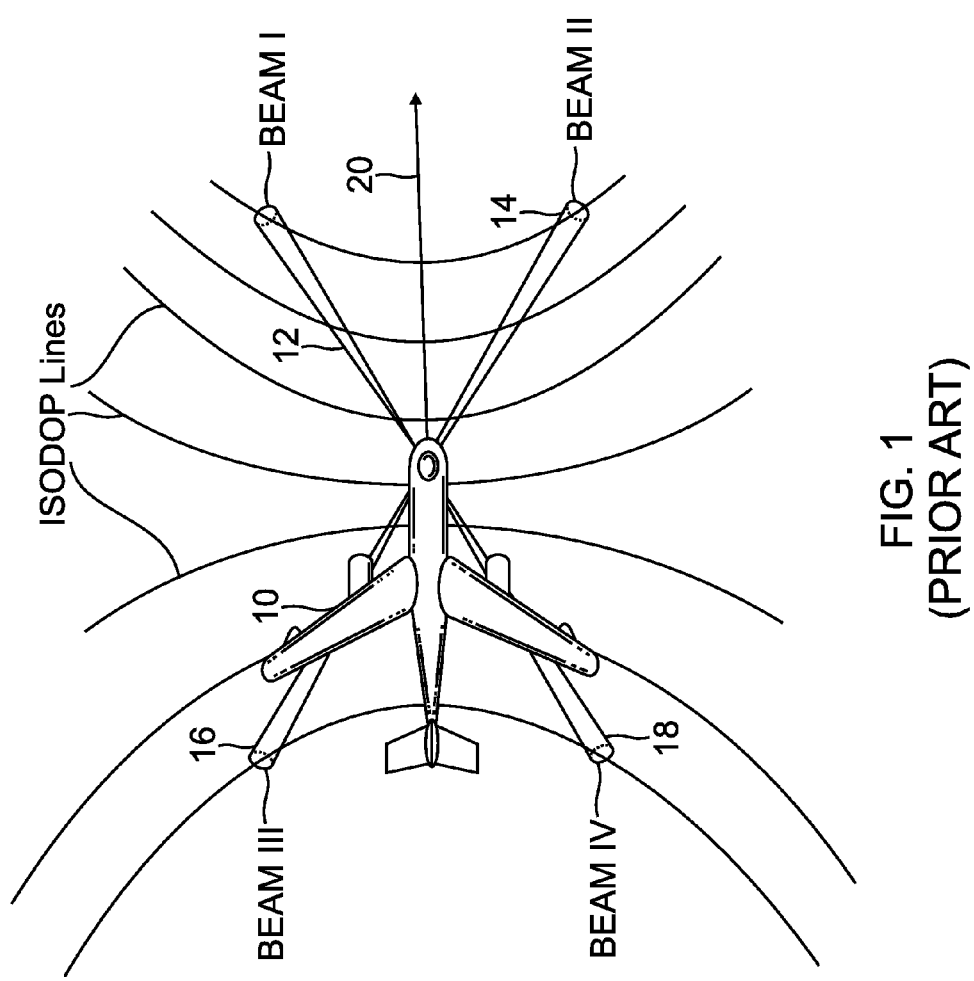
FIG. 1 is a top view of a conventional Doppler radar navigation scheme for an aircraft.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for estimating velocity and attitude of an aircraft is provided. The present method provides an independent source of a velocity vector when an aircraft is flying over water, without the need for high radio frequency or large antennas to form narrow beams. Additionally, the present method can be employed over land that is sufficiently flat when averaged over a sufficient distance.

In general, the system and method use a range vs. Doppler frequency plot to determine an angle of velocity vector above the horizon to calculate vertical velocity. In addition, a phase monopulse (interferometric measurements with multiple antennas) can be used to allow determination of direction of the velocity vector. The method can also use interferometric measurements in determination of aircraft pitch and roll angles. The method can output an estimated uncertainty based on range variation across the Doppler beams.

The present approach can be implemented with a system operating at a lower frequency and with a smaller antenna to perform the function of a Doppler navigator. A radar altimeter provides such a system due to its lower transmit frequency than standard Doppler navigators and its small antenna aperture. The wide antenna beam requires a very different approach to the estimation of velocity, which is described hereafter.

In one embodiment, the system can be implemented with a Doppler beam sharpened interferometric radar altimeter. Such a radar altimeter can be employed to obtain real-time estimation of velocity over water, which eliminates the requirement for narrow beam antennas as used in conventional Doppler navigators.

The method and system can utilize various inputs as aids to improve accuracy of velocity estimation. For example, an indication can be provided that the aircraft is over water in order to confirm that a flat ocean assumption will be valid. An indication of sea state can also be provided, which aids in determining the expected noise or error in the velocity estimation. A direction and/or speed of wind indicator can be provided, to aid in removing the noise or error contribution due to the wind, which is the primary contributor to ocean waves. A map of slope can be employed for use in eliminating velocity estimation bias due to sloping terrain. In addition, a suitability indication input or map of suitability can be provided, indicating what areas are to be considered suitable for a velocity measurement. This suitability input can be used to switch between the method described herein and another system function.

Further details of the present method and system are described hereafter with reference to the drawings.

In one embodiment, the velocity and attitude estimation method relies on Doppler beam sharpening, a technique that is well understood by those skilled in the art. FIG. 1 shows a conventional Doppler radar navigation system for an aircraft 10 that uses multiple Doppler beams 12, 14, 16, and 18 (beams I-IV) Isodops (lines of equal Doppler frequency shift) are generated by the intersections of constant Doppler cones with an assumed flat surface. The aircraft 10 transmits beams 12, 14, 16 and 18 toward the ground and receives reflections therefrom. The respective pairs of beams 12, 14 and beams 16, 18 are symmetrically disposed in front of and to the rear of aircraft 10. Under the "no drift" conditions shown in FIG. 1, where the ground-track 20 of aircraft 10 coincides with the heading of aircraft 10, the pattern of isodops are symmetrically disposed with respect to both the longitudinal and transverse axes of aircraft 10. Therefore, each of the pair of forward beams 12 and 14 (beams I and II) lie on the same isodop as each other, and each of the pair of rear beams 16 and 18 (beams III and IV) also lie on the same isodop as each other.

A Doppler cone has its vertex positioned at the center of the radar antenna and its axis aligned with the velocity vector of the aircraft. The angle between the axis of the cone and the surface of the cone is dependent on the Doppler frequency and the velocity, and is well known by those skilled in the art. Over a flat surface, the range measured in each Doppler beam will represent the distance to the point where the isodop line in FIG. 1 passes directly below the velocity vector.

Figure 2:
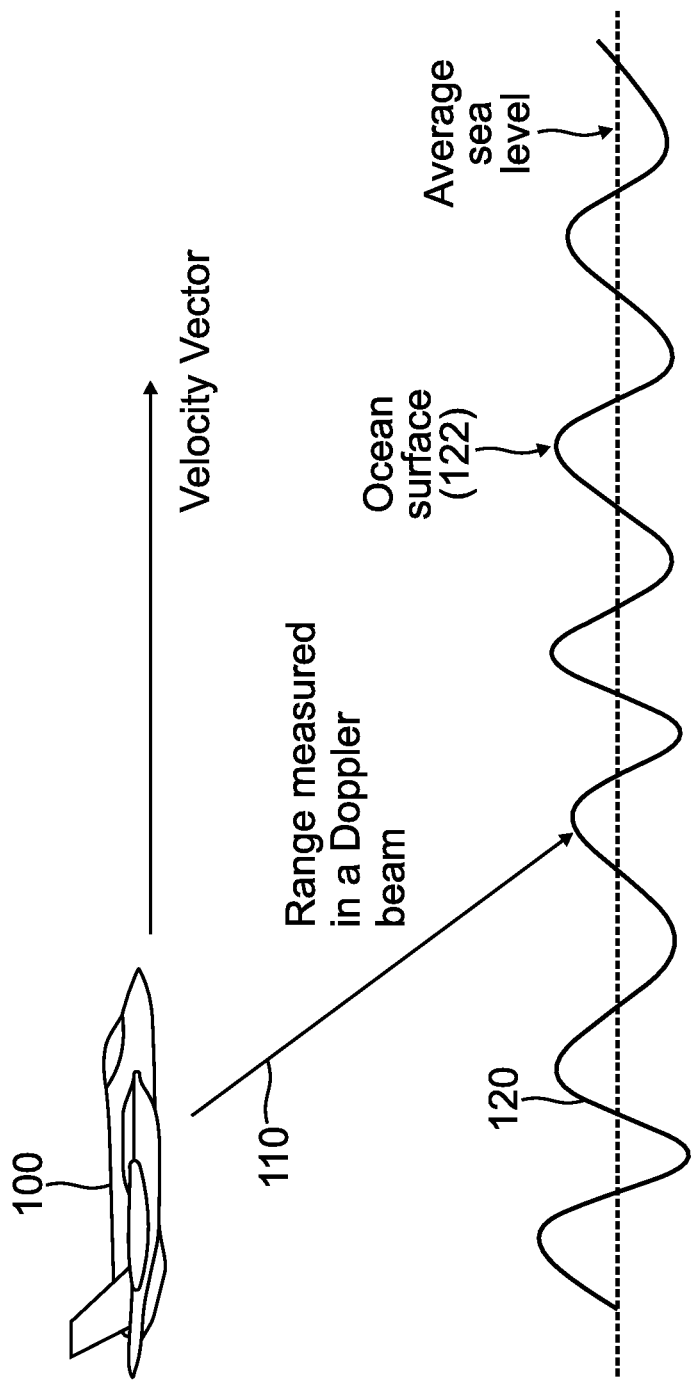
FIG. 2 is a side view of a Doppler radar navigation scheme for an aircraft that employs velocity estimation according to one embodiment.

FIG. 2 illustrates a Doppler radar navigation system for an aircraft 100 that employs velocity estimation according to the present approach, which can use a Doppler beam sharpened interferometric radar altimeter. FIG. 2 show that waves 120 on an ocean surface 122 will cause variation in a range measured in a Doppler beam 110 from aircraft 100 as compared to a calm sea (average sea level). The present method assumes that when averaged over a sufficiently long period of time, the range measurements observed during flight over the ocean will be representative of a flat surface. Observations of range vs Doppler frequency will then follow a known relationship depending on the velocity.

Figure 3:
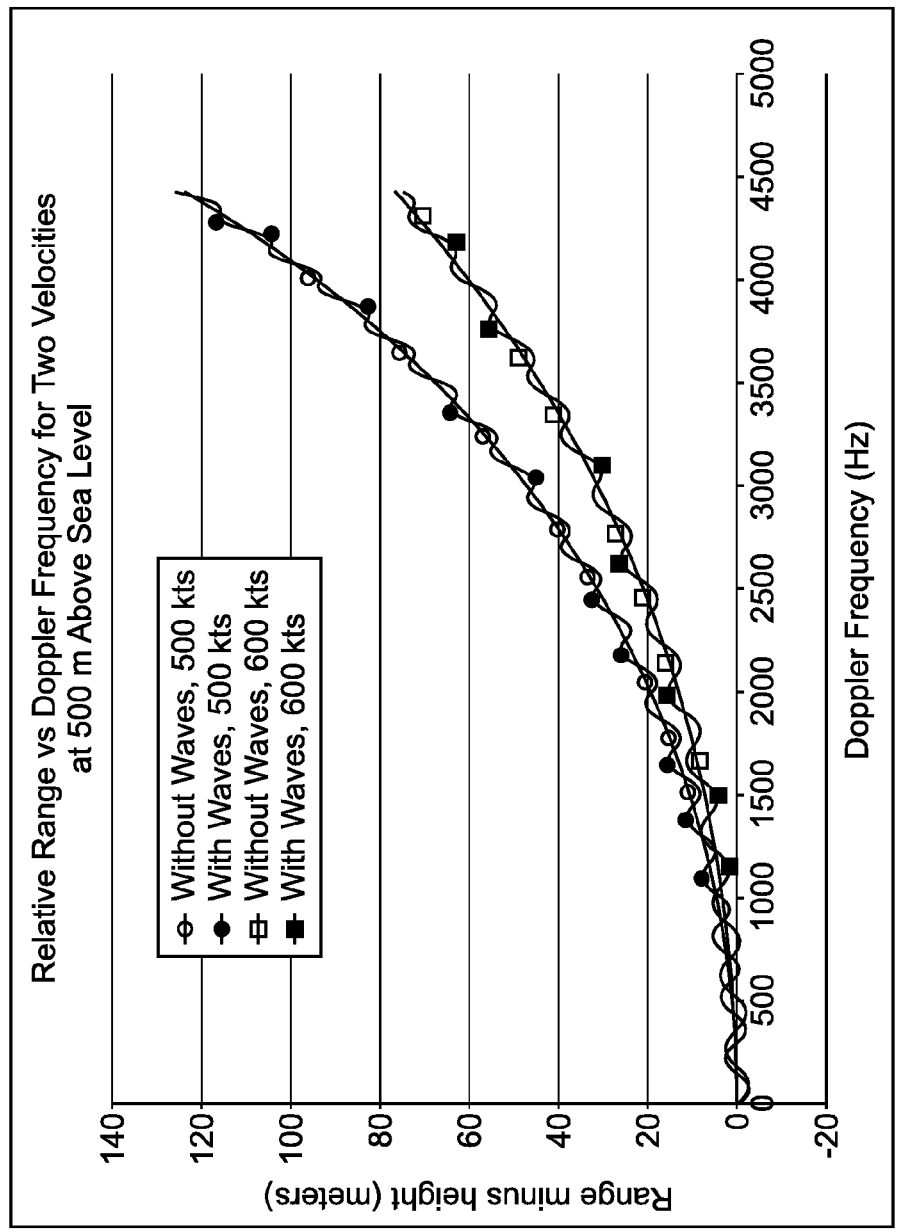
FIG. 3 is a graph of relative range measurements with respect to Doppler frequency for example velocities.

The graph of FIG. 3 provides an illustration of how range measurements vary with Doppler frequency for example velocities of 500 knots and 600 knots, with and without waves present. The height above sea level was simulated as 500 meters and was subtracted from the estimated range measurements. It was assumed that the aircraft would be flying straight and level. The wave was simulated as a sine wave with a peak to trough difference of 5 meters and a distance of 20 meters between peaks.

As shown by the graph of FIG. 3, the velocity magnitude can be estimated by determining the curve of range versus Doppler frequency that best fits the data. FIG. 3 illustrates the result of straight and level flight. If the aircraft is ascending or descending, the curve will exhibit additional skew. The skew is predictable and can be used to determine the angle of the velocity vector above the horizon.

Figure 4:
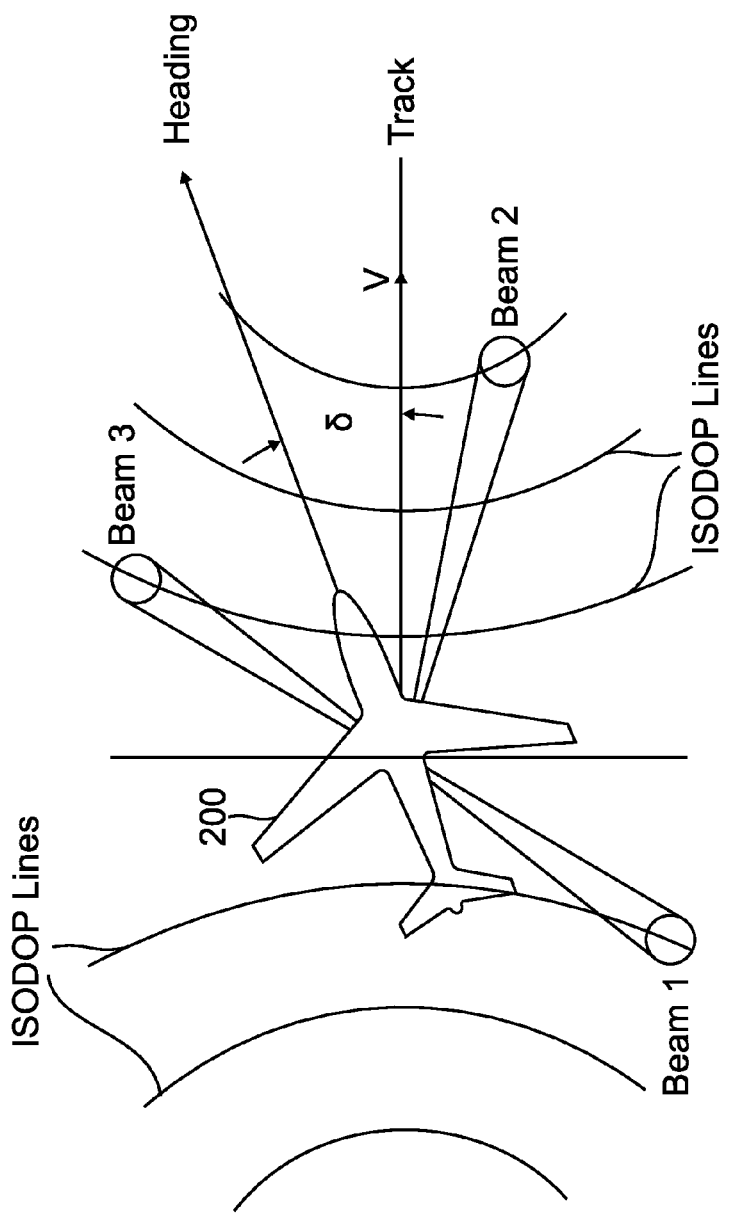
FIG. 4 is a top view of another conventional Doppler radar navigation scheme for an aircraft.

The present method can additionally employ phase monopulse radar techniques, using two or more antenna apertures, to determine angle of arrival of the Doppler beam. This approach does not rely on forming a narrow beam and therefore will work with smaller antennas. Because the surface of the ocean is assumed to be flat when averaged over time or distance, the averaged angle of arrival provides an estimated heading angle component of the velocity vector. This is particularly important due to wind acting on an aircraft. For example, wind conditions can create a crab angle (δ) where the track that an aircraft 200 follows does not align with the direction of the nose of aircraft 200 (i.e., the "heading"), as illustrated in FIG. 4. Here, the nearest target within each of Doppler beams 1, 2, and 3 (i.e., along each isodop line) occurs along the track of aircraft 200. The phase angle, range, and Doppler values can be used in the estimation of the velocity vector (V) along the track of aircraft 200. Additionally, interferometric angles measured from multiple antenna apertures can be used to determine the attitude of aircraft 200 relative to a flat surface.

Although the focus of this description is on flight over an ocean, the present method is also applicable to flight over any area of land that can be considered flat when averaged over sufficient distance. This method may also be applicable in some cases over sloped land. For example, if the average slope of the land is sufficiently consistent over the area of uncertainty surrounding the current assumed position of the navigation system, and the navigation system has access to a map indicating the average slope of the land in this area, the slope may be used to cancel out the velocity bias that would be present in the velocity estimate.

Additionally, a map of suitability can be used to indicate when the navigation system is over a geographical position where the present method would be expected to compute a reliable update. This will then provide the navigation system with an indication of when to trust the velocity inputs computed.

The basic components of a radar altimeter are well understood by those skilled in the art and will not be provided in detail herein. In general, a radar altimeter includes a transmit aperture and one or more receive apertures, with one receiver channel for each receive aperture. The transmitter may share a single aperture with one of the receive channels, typically via a circulator. For the purpose of the present disclosure, a channel is assumed to be the collection of receiver radio frequency (RF) and intermediate frequency (IF) circuitry, and analog to digital (A/D) converter, necessary to convert the RF received at a receive aperture to digitized samples to be processed in the receiver.

The present velocity estimation method can be implemented with a Doppler beam sharpened radar altimeter to generate a range vs. Doppler array, such as disclosed in U.S. application Ser. No. 14/613,879, filed on Feb. 4, 2015, and entitled SYSTEMS AND METHODS FOR MEASURING VELOCITY WITH A RADAR ALTIMETER, the disclosure of which is incorporated by reference herein.

Figure 5:
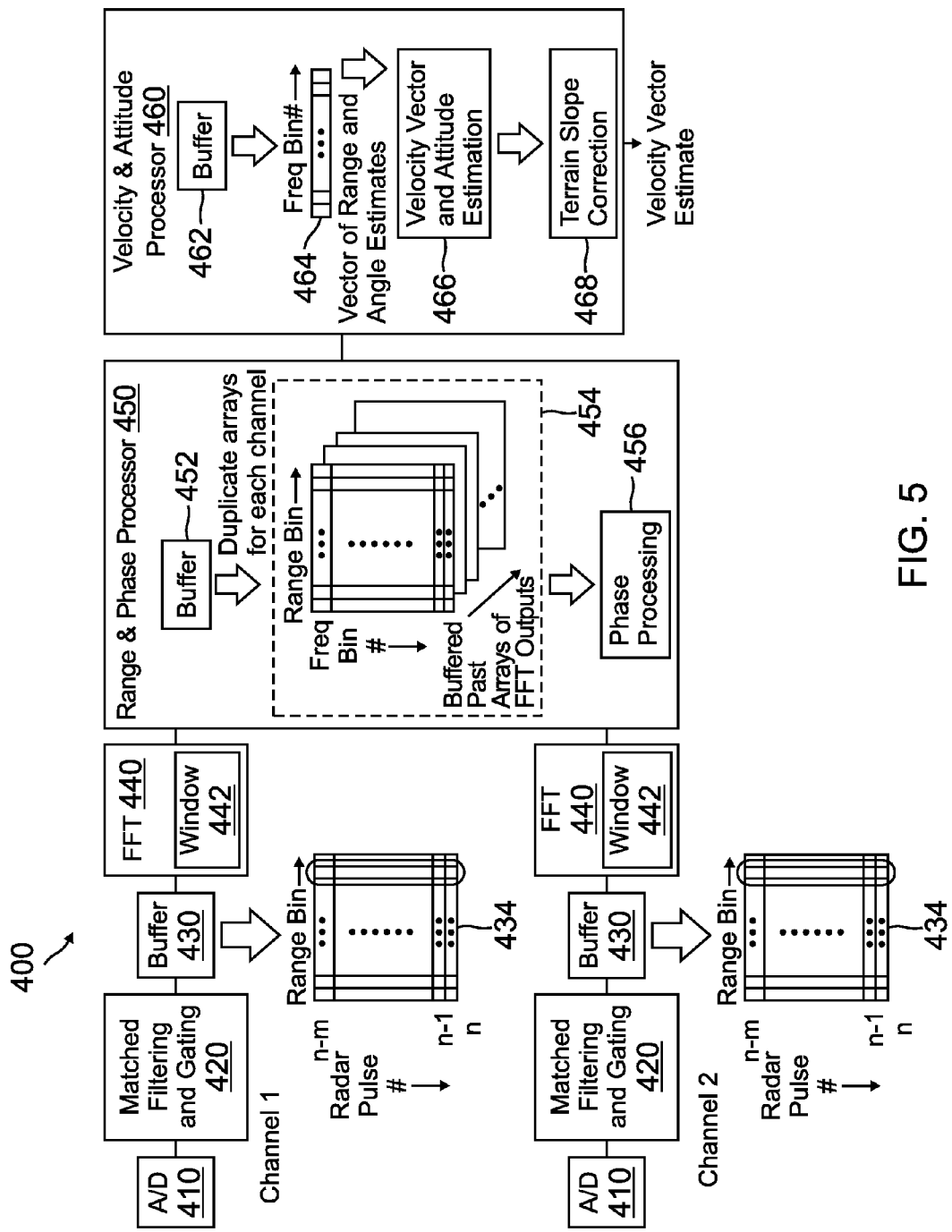
FIG. 5 is a block diagram of a system in a Doppler beam sharpened radar altimeter for estimating velocity and attitude according to one embodiment.

FIG. 5 illustrates a system 400 in a Doppler beam sharpened radar altimeter for estimating velocity. While system 400 is shown with two channels, it should be understood that there can be more than two channels. Processing for each channel begins at an A/D converter 410, where the analog baseband or IF signal is digitized. Matched filtering and gating 420 is performed to separate each single pulse repetition interval (PRI) into complex-valued samples at each range bin (quantized range position). Multiple PRIs are collected in a buffer 430 to form an array 434. A fast Fourier transform (FFT) 440 is performed on each column of array 434 scaled through a window 442 to compute a frequency spectrum (i.e., multiple Doppler beams) at each range bin. A range and phase processor 450 collects the results in a buffer 452 to form duplicate arrays for each channel of range vs frequency at 454.

The past arrays of FFT outputs may be used to compute an average magnitude of individual cells in the array over time. This can improve signal to noise ratio and therefore improve the estimation of the range to the surface within a Doppler beam. In the present technique, the arrays contain complex-valued values for use in comparison of phase angle as measured between multiple antennas. The magnitudes of the values in the cells are used to detect the location of the nearest target in each Doppler beam (each row in the array). The arrays at 454 in FIG. 5 can be created for each of the antenna apertures that are used.

Phase processing is then performed at 456 on the range/Doppler cells representing the closest target within each Doppler beam (i.e., each row of a range/Doppler array at 483-1). The phase processing makes a comparison between the multiple apertures to determine the direction of arrival of the beam. Combining interferometric angle estimates made over time and across the Doppler beams allows an accurate estimation of the direction of the velocity vector.

A velocity and attitude processor 460 accepts range, frequency, and phase angle information from range and phase processor 450 in a buffer 462, and creates frequency bin 464. The frequency bin 464 outputs a vector of range and angle estimates, which are used for velocity vector and attitude estimation at 466. Specifically, the velocity vector magnitude can be computed by determining the best fit to the range vs frequency data. This additionally allows the determination of the angle of the velocity vector above the horizon. The angle of the velocity vector in the horizontal plane can be determined as described hereafter. When needed, a terrain slope correction can be calculated at 468. A velocity vector estimate is then output from processor 460.

The present method can also make use of interferometric measurements of phase angle between two or more antenna apertures. Ideally, in the case of two antennas, these antennas are placed such that a line passing through the phase centers of the two antennas will be parallel to the pitch axis of the aircraft. First, this minimizes the interaction between aircraft pitch angle and computation of the horizontal angle component of the velocity vector. Second, this allows for maximum observability of the angle of arrival of the nearest range measured within a Doppler beam.

Iso-phase lines represent a line of points along the surface for which the receiver will observe the same phase angle difference when comparing the signal received at two antennas. Similar to the formation of isodop lines described above, iso-phase lines can be illustrated as the intersections of cones with the flat surface over which the aircraft is flying. Assuming the distance to the surface is much larger than the distance between the antennas, the cones' vertices are located at the mid-point between the phase centers of two antennas, and their axes are aligned with the line connecting the phase centers.

Figure 6:
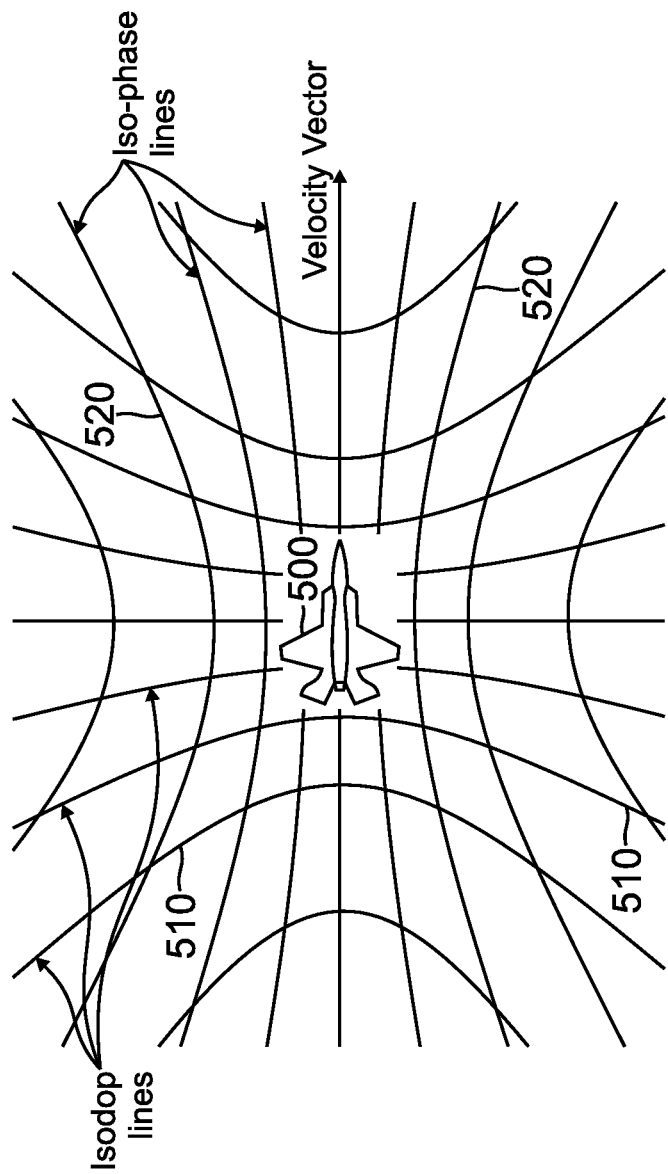
FIG. 6 is a top view of a Doppler radar navigation scheme for an aircraft that employs velocity estimation according to another embodiment.

In the case where the aircraft is flying straight and level and the antennas are aligned along the pitch axis as described above, the iso-phase lines will form a family of lines perpendicular to the family of isodop lines described previously. This is illustrated in FIG. 6 for an aircraft 500, where isodop lines 510 intersect with iso-phase lines 520. This arrangement allows for optimal estimation of angle of the velocity vector relative to the nose of the aircraft. As the track direction begins to deviate from the heading direction, isodop lines will stay aligned with the track of the aircraft while the iso-phase lines will stay aligned with the body of the aircraft. From this, it is clear that the phase angle measurements will provide an estimate of the angle of the velocity vector relative to the body of the aircraft.

Figure 7:
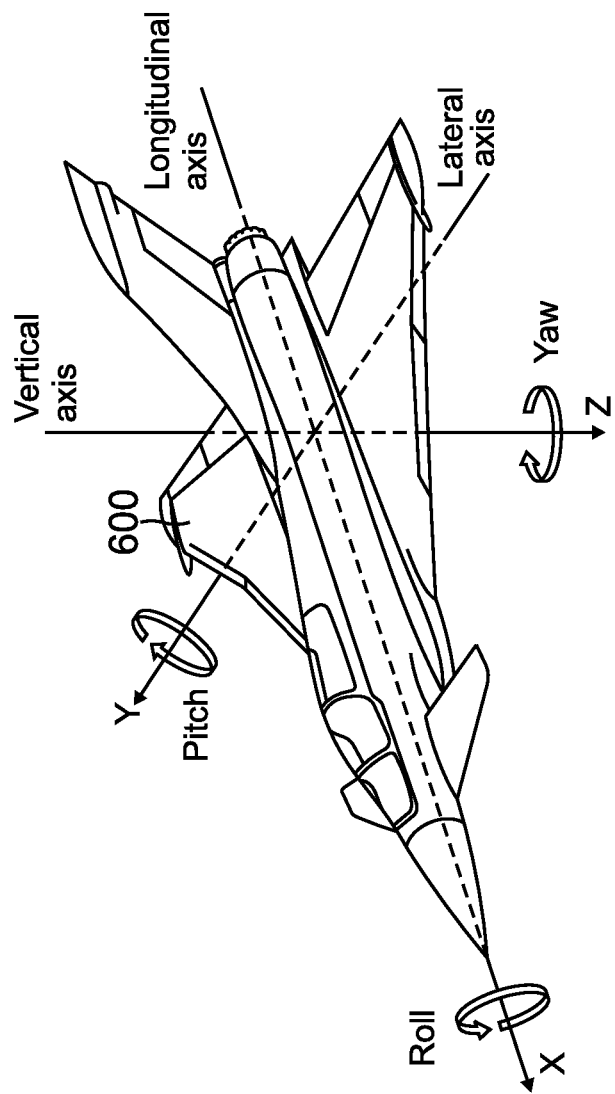
FIG. 7 is a perspective view of a standard body-fixed reference frame for an aircraft.

With two antennas aligned as previously described, the roll angle of the aircraft can be estimated based on the interferometric phase angle measured to the nearest target beneath the aircraft. The angle to the nearest point over a flat surface of the earth will directly provide roll angle of the aircraft. If a third antenna is added, both the pitch angle and the roll angle can be resolved. In order to obtain both the pitch angle and the roll angle, the third antenna's phase center is not aligned with the phase centers of the other two antennas. In one embodiment, the phase centers of the three antennas are points that are equal-distant from each other, with these three points defining a plane. Ideally, this plane will be parallel to the X-Y plane of the body-fixed reference frame of the aircraft. This body-fixed reference frame is well known to those skilled in the art, and is illustrated in FIG. 7 for an aircraft 600. The X-axis is the longitudinal axis of aircraft 600 and aligns with the direction of the aircraft nose. The Y-axis is the lateral axis of aircraft 600 and passes through the aircraft wings. The Z-axis is the vertical axis through the body of aircraft 600. The roll, pitch, and yaw of aircraft 600 occur respectively along the X, Y, and Z axes.

To further improve the estimation of pitch and roll, the present method may combine the interferometry-based direction of arrival and range measurement within each Doppler swath, to form multiple range vectors. These points in three-dimensional space will lie roughly along a straight line. A best straight-line fit to these points can then be computed. This straight line can be assumed to lie on a plane defining the ideally flat surface below the aircraft. A vector normal to the surface can be estimated to extend out from the point along the line at its nearest approach to the aircraft. The angle of this normal vector relative to the aircraft will then directly provide the pitch and roll angle of the aircraft relative to the ocean surface.

The velocity and attitude processor can take a number of additional inputs to aid in its computation of velocity. If an indicator of "over water" is included, the navigation system can use this to enable the present velocity estimation method. If sea state and/or wind direction and/or speed are provided, the navigation system can apply a correction to the velocity vector information based on known impact on velocity estimation due to wind direction and speed. This correction can be in the form of a change in the direction and/or magnitude of the velocity vector, or in the form of an accuracy or uncertainty value that can provide an indication of the expected accuracy of the velocity estimate. If "over water" is not indicated, then the navigation system may ignore the sea state and wind information since it would not be applicable when not over water.

If flying over sloped land, an input for terrain slope may be used to correct for a known impact on velocity estimation due to terrain slope. The present technique assumes the surface over which it flies is flat and will produce velocity and attitude information based on that assumption. If the terrain is pitched at 5 degrees, for example, the resulting attitude and velocity vector directions will be pitched 5 degrees as compared to the solution one would compute over a truly flat surface. Therefore, a simple correction applied to the angular information output by the present method will translate the coordinates into a frame whose horizontal plane is parallel to the ellipsoid defined in the navigation system.

Also, an indication of suitability may be used to indicate to the navigation system that the position at which the navigation system is located is suitable to the estimation of velocity using the velocity estimation method described herein. When the suitability input indicates that this location is not suitable, then the navigation system may default to a simple measurement of altitude, or may switch to a velocity estimation method such as disclosed in U.S. application Ser. No. 14/613,879, which will provide an estimate of velocity, but generally with a longer latency in the output and possibly more signal processing.

Figure 8:
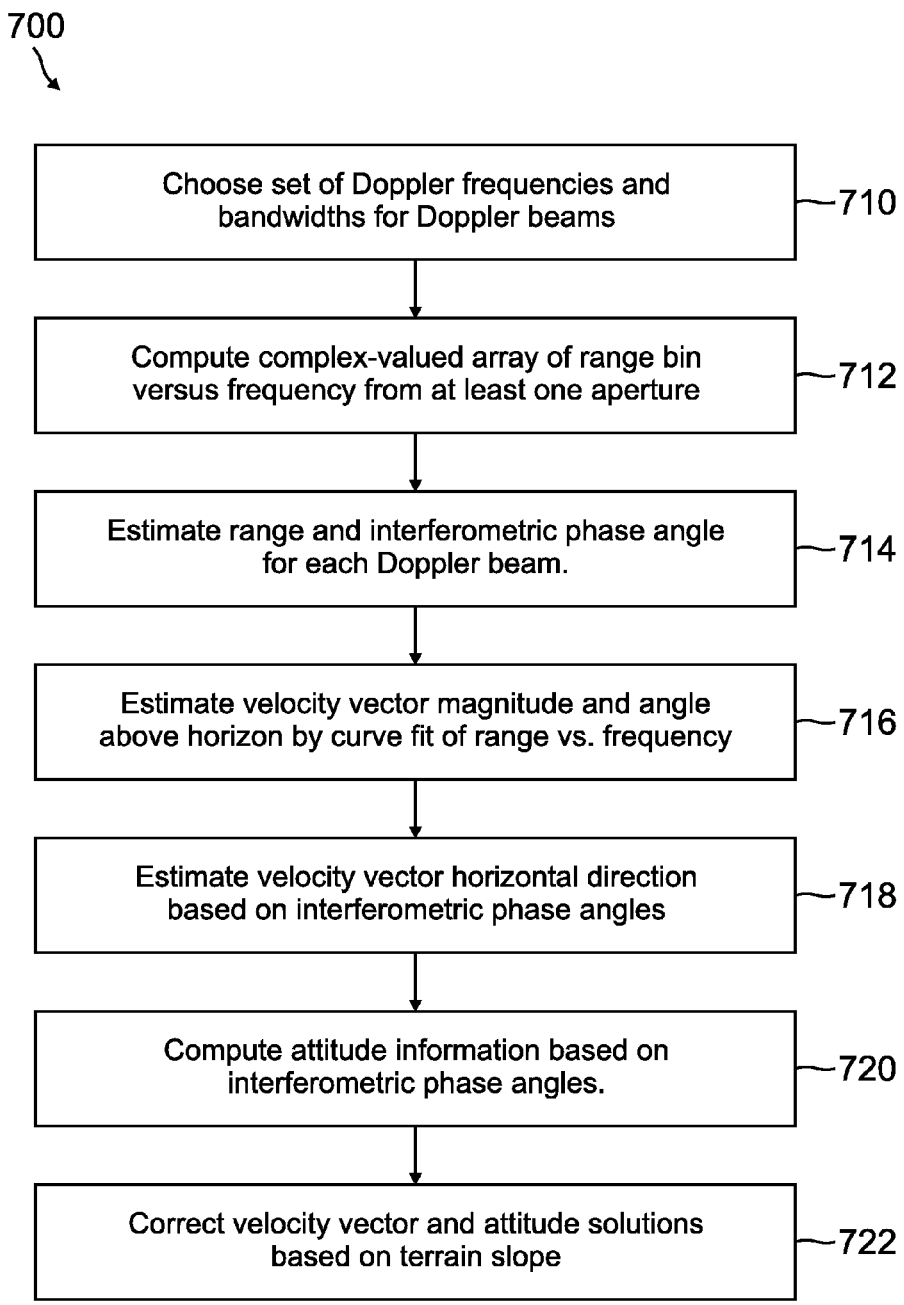
FIG. 8 is a flow diagram of a velocity and attitude estimation method for an aircraft according to one embodiment.

FIG. 8 is a flow diagram of a velocity and attitude estimation method 700, which can be implemented with Doppler beams according to one embodiment. Initially, a set of Doppler frequencies and bandwidths for Doppler beams are chosen (block 710). The method computes a complex-valued array of range bin versus frequency from at least one aperture (block 712), and estimates a range and interferometric phase angle for each Doppler beam (block 714). The method then estimates velocity vector magnitude and angle above horizon by curve fit of range vs. frequency (block 716). The method also estimates velocity vector horizontal direction based on interferometric phase angles (block 718), and computes attitude information based on interferometric phase angles (block 720). The method can correct velocity vector and attitude solutions based on terrain slope when needed (block 722).

Figure 9:
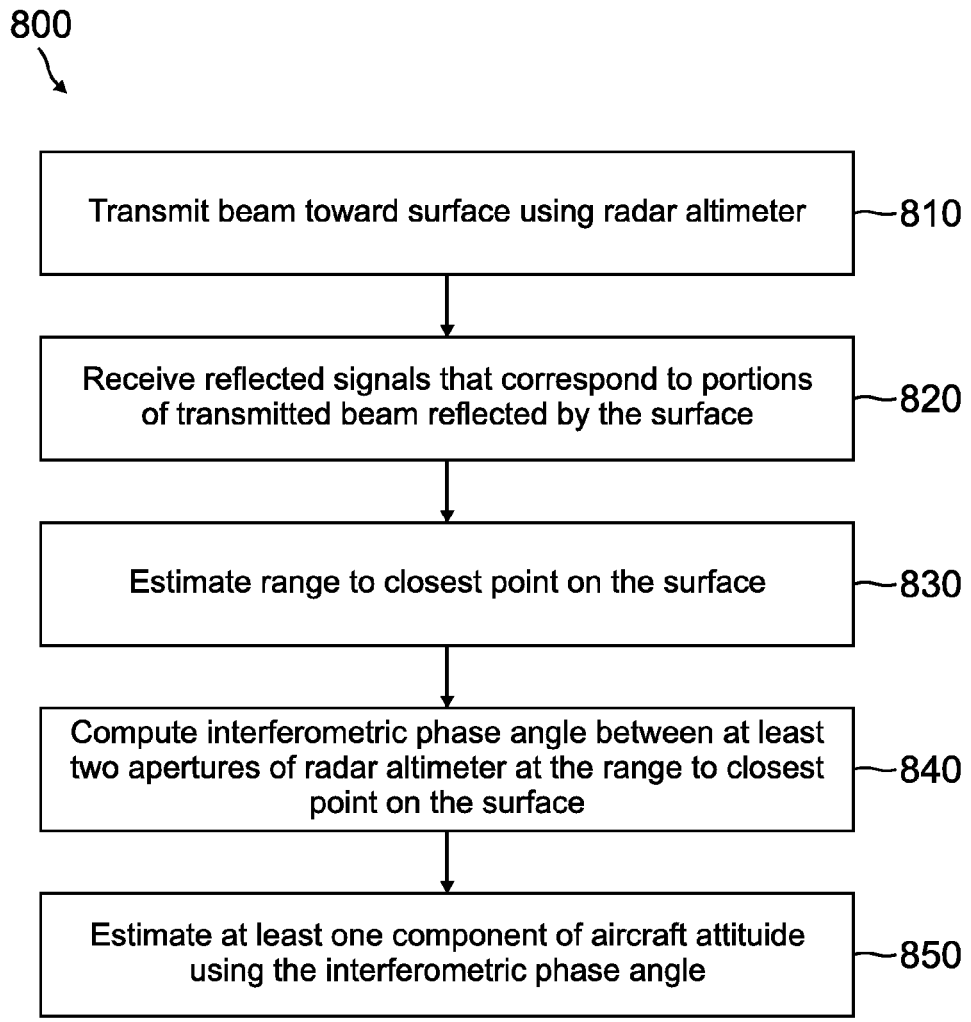
FIG. 9 is a flow diagram of an attitude estimation method for an aircraft according to another embodiment.

FIG. 9 is a flow diagram of a method 800 for estimating attitude of an aircraft, which does not require Doppler beam sharpening. A beam is transmitted toward a surface from the aircraft using a radar altimeter (block 810). A plurality of reflected signals is received in the aircraft that correspond to portions of the transmitted beam that are reflected by the surface (block 820). A range to a closest point on the surface is then estimated (block 830). The method 800 computes at least one interferometric phase angle between at least two antenna apertures of the radar altimeter at the range to the closest point on the surface (block 840). At least one component of aircraft attitude is then estimated using the at least one interferometric phase angle (block 850).

A computer or processor used in the present method and system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for estimating velocity of an aircraft, the method comprising: transmitting a beam toward a surface from the aircraft using a Doppler beam sharpened radar altimeter; receiving a plurality of reflected signals that correspond to portions of the transmitted beam that are reflected by the surface; forming a plurality of Doppler beams by filtering the received signals; computing a complex-valued array of range bin with respect to frequency of the Doppler beams from at least one antenna aperture of the radar altimeter; estimating a range for each of the Doppler beams; and estimating a velocity vector magnitude for the aircraft by a curve fit of the range with respect to the frequency of the Doppler beams.

Example 2 includes the method of Example 1, wherein the estimated velocity vector magnitude comprises a real-time estimate of velocity of the aircraft over water.

Example 3 includes the method of any of Examples 1-2, further comprising determining an estimated uncertainty based on a range variation across the Doppler beams.

Example 4 includes the method of any of Examples 1-3, wherein an angle above horizon is used to calculate a vertical velocity.

Example 5 includes the method of any of Examples 1-4, further comprising estimating interferometric phase angles for each of the Doppler beams using at least two antenna apertures of the radar altimeter; and estimating a velocity vector horizontal direction of the aircraft based on the interferometric phase angles of the Doppler beams.

Example 6 includes the method of any of Examples 1-5, further comprising estimating interferometric phase angles for each of the Doppler beams using at least two antenna apertures of the radar altimeter; and computing an attitude of the aircraft based on the interferometric phase angles of the Doppler beams.

Example 7 includes the method of any of Examples 1-6, further comprising correcting the velocity vector magnitude based on a terrain slope of the surface.

Example 8 includes the method of any of Examples 5-7, further comprising correcting the velocity vector horizontal direction based on a terrain slope of the surface.

Example 9 includes the method of any of Examples 6-8, further comprising correcting the attitude of the aircraft based on a terrain slope of the surface.

Example 10 includes the method of any of Examples 1-9, further comprising estimating an angle above horizon for the aircraft by a curve fit of the range with respect to the frequency of the Doppler beams.

Example 11 includes a computer program product comprising a non-transitory computer readable medium having instructions stored thereon executable by a processor to perform a method for estimating velocity of an aircraft according to any of Examples 1-10.

Example 12 includes a system for estimating velocity of an aircraft, the system comprising: at least one processor in the aircraft; and a processor readable medium having instructions stored thereon executable by the processor to: transmit a beam toward a surface from the aircraft using a Doppler beam sharpened radar altimeter; receive a plurality of reflected signals that correspond to portions of the transmitted beam that are reflected by the surface; form a plurality of Doppler beams by filtering the received signals; compute a complex-valued array of range bin with respect to frequency of the Doppler beams from at least one antenna aperture of the radar altimeter; estimate a range for each of the Doppler beams; and estimate a velocity vector magnitude for the aircraft by a curve fit of the range with respect to the frequency of the Doppler beams.

Example 13 includes the system of Example 12, wherein the processor readable medium has further instructions stored thereon executable by the processor to estimate interferometric phase angles for each of the Doppler beams using at least two antenna apertures of the radar altimeter, and estimate a velocity vector horizontal direction of the aircraft based on the interferometric phase angles of the Doppler beams.

Example 14 includes the system of any of Example 12-13, wherein the processor readable medium has further instructions stored thereon executable by the processor to estimate interferometric phase angles for each of the Doppler beams using at least two antenna apertures of the radar altimeter, and compute an attitude of the aircraft based on the interferometric phase angles of the Doppler beams.

Example 15 includes the system of any of Examples 12-14, wherein the processor readable medium has further instructions stored thereon executable by the processor to correct the velocity vector magnitude based on a terrain slope of the surface.

Example 16 includes a method for estimating attitude of an aircraft, the method comprising: transmitting a beam toward a surface from the aircraft using a radar altimeter; receiving a plurality of reflected signals that correspond to portions of the transmitted beam that are reflected by the surface; estimating a range to a closest point on the surface; computing at least one interferometric phase angle between at least two antenna apertures of the radar altimeter at the range to the closest point on the surface; and estimating at least one component of aircraft attitude using the at least one interferometric phase angle.

Example 17 includes the method of Example 16, wherein the at least one component of aircraft attitude includes a pitch angle or a roll angle.

Example 18 includes the method of any of Examples 16-17, further comprising correcting the estimated at least one component of aircraft attitude based on a terrain slope of the surface.

Example 19 includes a computer program product comprising a non-transitory computer readable medium having instructions stored thereon executable by a processor to perform a method for estimating attitude of an aircraft according to any of Examples 16-18.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for estimating velocity of an aircraft, the method comprising:
   transmitting a beam toward a surface from the aircraft using a Doppler beam sharpened radar altimeter;
   receiving a plurality of reflected signals that correspond to portions of the transmitted beam that are reflected by the surface;
   forming a plurality of Doppler beams by filtering the received signals;
   computing a complex-valued array of range bin with respect to frequency of the Doppler beams from at least one antenna aperture of the radar altimeter;
   estimating a range for each of the Doppler beams; and
   estimating a velocity vector magnitude for the aircraft by a curve fit of the range with respect to the frequency of the Doppler beams.

2. The method of claim 1, wherein the estimated velocity vector magnitude comprises a real-time estimate of velocity of the aircraft over water.

3. The method of claim 1, further comprising determining an estimated uncertainty based on a range variation across the Doppler beams.

4. The method of claim 1, wherein an angle above horizon is used to calculate a vertical velocity.

5. The method of claim 1, further comprising:
   estimating interferometric phase angles for each of the Doppler beams using at least two antenna apertures of the radar altimeter; and
   estimating a velocity vector horizontal direction of the aircraft based on the interferometric phase angles of the Doppler beams.

6. The method of claim 1, further comprising:
   estimating interferometric phase angles for each of the Doppler beams using at least two antenna apertures of the radar altimeter; and
   computing an attitude of the aircraft based on the interferometric phase angles of the Doppler beams.

7. The method of claim 1, further comprising correcting the velocity vector magnitude based on a terrain slope of the surface.

8. The method of claim 5, further comprising correcting the velocity vector horizontal direction based on a terrain slope of the surface.

9. The method of claim 6, further comprising correcting the attitude of the aircraft based on a terrain slope of the surface.

10. The method of claim 1, further comprising estimating an angle above horizon for the aircraft by a curve fit of the range with respect to the frequency of the Doppler beams.

11. A computer program product, comprising:
   a non-transitory computer readable medium having instructions stored thereon executable by a processor to perform a method for estimating velocity of an aircraft according to claim 1.

12. A system for estimating velocity of an aircraft, the system comprising:
   at least one processor in the aircraft; and
   a processor readable medium having instructions stored thereon executable by the processor to:
   transmit a beam toward a surface from the aircraft using a Doppler beam sharpened radar altimeter;
   receive a plurality of reflected signals that correspond to portions of the transmitted beam that are reflected by the surface;

form a plurality of Doppler beams by filtering the received signals;

compute a complex-valued array of range bin with respect to frequency of the Doppler beams from at least one antenna aperture of the radar altimeter;

estimate a range for each of the Doppler beams; and estimate a velocity vector magnitude for the aircraft by a curve fit of the range with respect to the frequency of the Doppler beams.

13. The system of claim 12, wherein the processor readable medium has further instructions stored thereon executable by the processor to:

estimate interferometric phase angles for each of the Doppler beams using at least two antenna apertures of the radar altimeter; and estimate a velocity vector horizontal direction of the aircraft based on the interferometric phase angles of the Doppler beams.

14. The system of claim 12, wherein the processor readable medium has further instructions stored thereon executable by the processor to:

estimate interferometric phase angles for each of the Doppler beams using at least two antenna apertures of the radar altimeter; and compute an attitude of the aircraft based on the interferometric phase angles of the Doppler beams.

15. The system of claim 12, wherein the processor readable medium has further instructions stored thereon executable by the processor to correct the velocity vector magnitude based on a terrain slope of the surface.

16. A method for estimating attitude of an aircraft, the method comprising:

transmitting a beam toward a surface from the aircraft using a radar altimeter;

receiving a plurality of reflected signals that correspond to portions of the transmitted beam that are reflected by the surface;

estimating a range to a closest point on the surface;

computing at least one interferometric phase angle between at least two antenna apertures of the radar altimeter at the range to the closest point on the surface; and estimating at least one component of aircraft attitude using the at least one interferometric phase angle.

17. The method of claim 16, wherein the at least one component of aircraft attitude includes a pitch angle or a roll angle.

18. The method in claim 16, further comprising correcting the estimated at least one component of aircraft attitude based on a terrain slope of the surface.

19. A computer program product, comprising:

a non-transitory computer readable medium having instructions stored thereon executable by a processor to perform a method for estimating attitude of an aircraft according to claim 16.

* * * * *